United States Patent [19]

Denlinger et al.

[11] 4,329,696

[45] May 11, 1982

[54] INK JET FLUID SYSTEM

[75] Inventors: George W. Denlinger, Springboro, Ohio; Robert A. Wiley, Richardson; James H. Yu, Dallas, both of Tex.

[73] Assignee: The Mead Corporation, Dayton, Ohio

[21] Appl. No.: 171,594

[22] Filed: Jul. 23, 1980

[51] Int. Cl.³ .............................................. G01D 15/18

[52] U.S. Cl. .................................. 346/75; 346/140 R

[58] Field of Search ............. 346/75, 140 R; 137/391, 137/433, 238

[56] References Cited

U.S. PATENT DOCUMENTS

| | | | |
|---|---|---|---|
| 3,701,998 | 10/1972 | Matais | 346/75 |
| 3,761,953 | 9/1973 | Helgeson | 346/75 |
| 3,891,121 | 6/1975 | Stoneburner | 346/75 X |
| 3,929,071 | 12/1975 | Cialone | 346/75 X |
| 4,042,937 | 8/1977 | Perry | 346/75 X |
| 4,080,607 | 3/1978 | Breeman | 346/75 |
| 4,152,710 | 5/1979 | Matsuba | 346/75 X |
| 4,240,082 | 12/1980 | Yu | 346/75 |

FOREIGN PATENT DOCUMENTS 54-13337 1/1979 Japan .

OTHER PUBLICATIONS

Mead Dijit, Dayton Ohio, Drawing Nos. 4004164-0004, 4004229-00x, 4-4177 and 4-4216.

*Primary Examiner*—Joseph W. Hartary
*Attorney, Agent, or Firm*—Biebel, French & Nauman

[57] ABSTRACT

An ink jet fluid system includes a print head, defining a fluid reservoir, and further including at least one orifice communicating with the reservoir for generating a jet drop stream from the fluid flowing through the orifice. Inlet and outlet valves are connected to inlet and outlet openings of the print head, respectively, and a siphon line extending generally downward is connected to the outlet valve. A float valve, connected between the siphon line and the fluid supply system for the print head, vents the lower end of the siphon line to atmosphere to produce a sub-atmospheric fluid pressure within the print head after shutdown of the printer. The float valve includes a float which prevents air from entering the fluid supply through the valve. The float valve further is arranged so as to prevent ink within the valve from flowing out the vent opening.

18 Claims, 3 Drawing Figures

INK JET FLUID SYSTEM

BACKGROUND OF THE INVENTION

The present invention relates to an ink jet fluid system and, more particularly, to such a system in which sub-atmospheric pressure may be maintained within the print head of an ink jet printer after termination of printing operations to prevent subsequent fluid flow through the print head orifices.

Ink jet printers, such as disclosed in U.S. Pat. No. 3,891,121, issued June 24, 1975, to Stoneburner, are known in which ink is supplied at a pressure in excess of atmospheric pressure to a manifold communicating with a series of small diameter orifices. As the ink flows through the orifices under pressure, it forms fine filaments of fluid which break up into jets of discrete drops. At the point at which the drops break away from the filaments, they pass through electrically conductive charging rings to which charging potentials are selectively applied to charge selected ones of the drops. An electrostatic deflecting field, extending across the paths of the jet drop streams, deflects the charged drops into catch trajectories. A catcher is provided to catch the charged drops such that they are prevented from striking a print receiving medium. Uncharged drops, however, pass unaffected through the deflection field and are deposited upon the print receiving medium.

In the operation of such a printer, the fluid supplied to the manifold must be maintained at a pressure in excess of atmospheric pressure in order to produce the flow of fluid through the orifices and the resulting fluid filaments. After operation of the printer, however, it is important to terminate the fluid flow through the orifices such that the print head, charge rings, and other printer elements do not become wetted with ink in such a manner as to short out these elements and inhibit subsequent printer operation. Additionally, if ink should weep through the print head orifices, this ink may become dried and block the orifices.

The approach taken by Stoneburner, as disclosed in the Stoneburner '121 patent, is to terminate the supply of ink to the print head and simultaneously to replace this ink with a supply of a flushing fluid, such as a cleaning solvent liquid. Thereafter, the supply of flushing fluid is terminated and a line is opened from the manifold to a waste sump operating at a pressure substantially below atmospheric pressure. This sudden reduction of pressure in the manifold is sufficient to terminate the jets of flushing fluid, without producing masses of fluid at the orifices or the formation of erratic drops of fluid. Thereafter, air is supplied to the manifold to dry the manifold. It may be preferable in some applications to maintain ink within the manifold after shut down of the printer. The ink would have to be maintained at a pressure less than atmospheric pressure, however, to prevent weeping of the ink through the orifices. If a sub-atmospheric fluid pressure were maintained within the print head manifold by a pump system, however, such a pressure would not be maintained during a power failure.

Where ink is used to flush a print head by supplying the ink to a print head inlet and simultaneously removing it from a print head outlet, it is also important that air is not introduced into the ink as it is removed from the print head if the ink is to be returned to the system fluid supply.

U.S. Pat. No. 4,152,710, issued May 1, 1979, to Metsuba et al., discloses a fluid supply system for an ink jet printer in which a cross valve connects the printer nozzle to a tank at shut down. The tank has an opening in the upper portion thereof, for maintaining the internal pressure of the tank at atmospheric pressure and an inlet in the bottom of the tank which is connected by the cross valve to the nozzle. Ink from the tank is returned to the fluid supply system through an outlet opening in the side wall of the tank. The outlet opening is maintained at a height substantially identical with that of the nozzle such that the pressure of the ink at the nozzle at shut down is substantially equal to atmospheric pressure. A float within the tank closes the vent opening if the level of the fluid in the tank is raised by an abnormally large fluid flow to the tank during actuation of the cross valve. This system makes no provision for preventing air from entering the fluid supply system through the vent opening of the tank and, additionally, maintains the fluid pressure at the nozzle during shut down at substantially atmospheric pressure, with the result that some weeping of fluid out of the nozzle opening may occur.

A number of ink jet systems have incorporated a valve arrangement or other device in the return line from a printer catcher or gutter such that caught drops may be returned to the printer fluid supply system and resupplied to the print head without the introduction of air into the fluid supply system. One such arrangement is shown in U.S. Pat. No. 3,761,953, issued Sept. 25, 1973, to Helgeson et al. Helgeson incorporates a float valve in the return line from the printer catcher. A float within the valve is raised and lowered by the fluid within the valve so as to open and close a valve seat in the bottom of the valve.

U.S. Pat. No. 3,929,071, issued Dec. 30, 1975, to Cialone et al. discloses a printer in which the catcher return line includes a J-shaped tube in which a residual quantity of ink is held, thus sealing the return line and preventing air from being drawn into the line. Finally, Japanese Pat. No. 54-13337, dated Jan. 31, 1979, discloses a gutter having a float valve arrangement mounted therein which opens the gutter fluid outlet after a sufficient quantity of ink has been accumulated by the gutter.

Accordingly, it is seen that there is a need for an ink jet fluid system which provides a sub-atmospheric pressure within the print head after shut down, but which precludes air from being drawn into the return line from the print head to the fluid supply system.

SUMMARY OF THE INVENTION

An ink jet fluid system includes a print head means defining a fluid reservoir and having a fluid inlet and a fluid outlet communicating with the reservoir. The print head means further includes means defining at least one orifice communicating with the reservoir such that fluid supplied to the reservoir under pressure flows through the orifice and emerges from the print head as a jet drop stream. A fluid supply means, including a fluid supply tank, supplies fluid to the print head means through an inlet valve means which is connected between the fluid inlet and the fluid supply system. The inlet valve means controls the flow of fluid to the fluid reservoir of the print head from the fluid supply means. A siphon line means is connected to the fluid outlet and extends downward therefrom below the orifice by a predetermined distance. A float valve means is connected between the siphon line means and the fluid supply means for venting the lower end of the siphon line means to atmosphere to produce a siphon-action therethrough, while providing for fluid flow from the siphon line means to the fluid supply system. When the inlet valve means is closed at shut down of the print head means, the fluid within the reservoir is maintained at a pressure less than atmospheric pressure by the siphon line means such that fluid is prevented from flowing through the orifice.

The float valve means may include a float valve casing defining a valve chamber, a valve inlet connected to the siphon line means and communicating with the chamber, a valve outlet connected to the fluid supply means and communicating with the chamber, and a vent opening venting the chamber to the atmosphere. The float valve means further includes a float in the chamber for closing the valve outlet when the fluid level in the chamber is less than a minimum level, whereby air is prevented from passing into the fluid supply means through the float valve means, and for closing the vent opening when the fluid level in the chamber exceeds a maximum level, whereby fluid is prevented from flowing through the vent opening.

The valve inlet may be located on a side of the float valve casing. The float valve means may further include means defining a weir at the lower end of the siphon line means, whereby fluid is maintained in the siphon line means at shut down of the print head means so as to maintain the fluid within the print head means at a pressure less than atmospheric pressure.

The vent opening may be located on top of the float valve casing and the valve outlet may be located on the bottom of the float valve casing. The float may include a first valve closure member mounted on the top thereof and a second valve closure member mounted on the bottom thereof. The float valve casing defines a first valve seat surrounding the vent opening and a second valve seat surrounding the valve outlet. The first valve closure member is raised into contact with the first valve seat when the fluid level in the chamber exceeds the maximum fluid level. The second valve closure member is lowered into contact with the second valve seat when the fluid level in the chamber is less than the minimum level.

A method of preventing fluid flow through the jet orifice of the ink jet print head after shut down, in which the print head has a fluid inlet valve and a fluid outlet valve, with the outlet valve being connected to a downwardly extending siphon line which is vented to atmosphere at a predetermined distance below the jet orifice includes the steps of:

(a) opening the outlet valve, and (b) closing the inlet valve.

The fluid column in the siphon line reduces the fluid pressure in the print head to a pressure less than atmospheric pressure such that fluid flow through the jet orifice is prevented.

Accordingly, it is an object of the present invention to provide an ink jet printer having a print head defining a fluid reservoir to which fluid is supplied through an inlet and from which fluid is removed through an outlet, and in which the print head further defines at least one jet orifice communicating with the reservoir, in which a downwardly extending siphon line is connected to the print head outlet to maintain a sub-atmospheric fluid pressure in the reservoir after the printer terminates operations; to provide such a printer in which fluid removed from the reservoir through the outlet is returned to the printer fluid supply system; to provide such a printer in which a float valve is connected to the lower end of the siphon line such that the siphon line is vented to atmosphere; to provide such a printer in which the float valve includes a float which prevents air from being drawn into the fluid supply system through the valve and, further, which prevents fluid within the valve from flowing through the valve vent opening.

Other objects and advantages of the invention will be apparent from the following description, the accompanying drawings and the appended claims.

DETAILED DESCRIPTION OF THE PREFERRED EMBODIMENT

Figure 1:
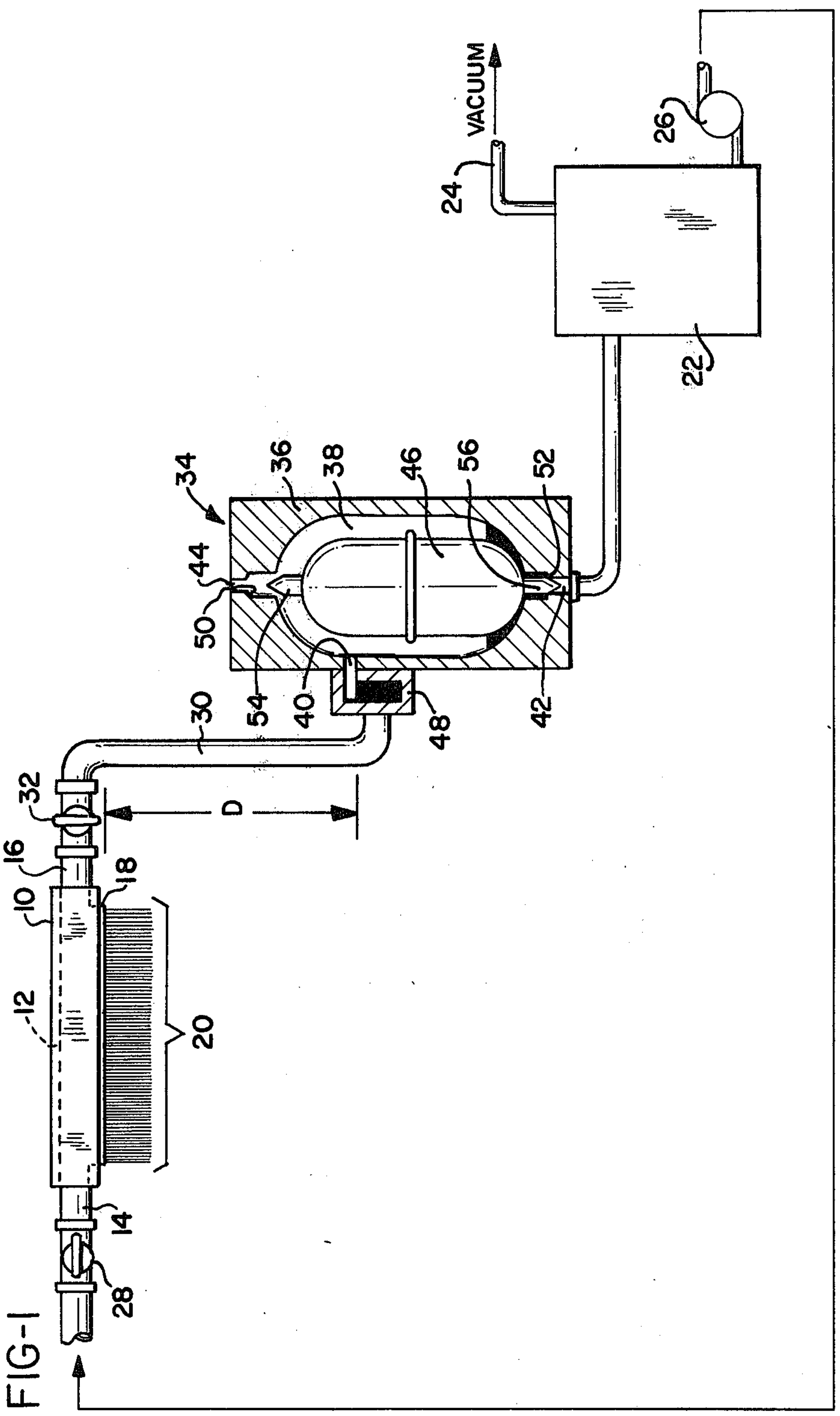
FIG. 1 is a diagrammatic view of an ink jet printer, including a fluid system, in accordance with the present invention, with portions in section, illustrating the fluid system during operation of the printer.
Figure 2:
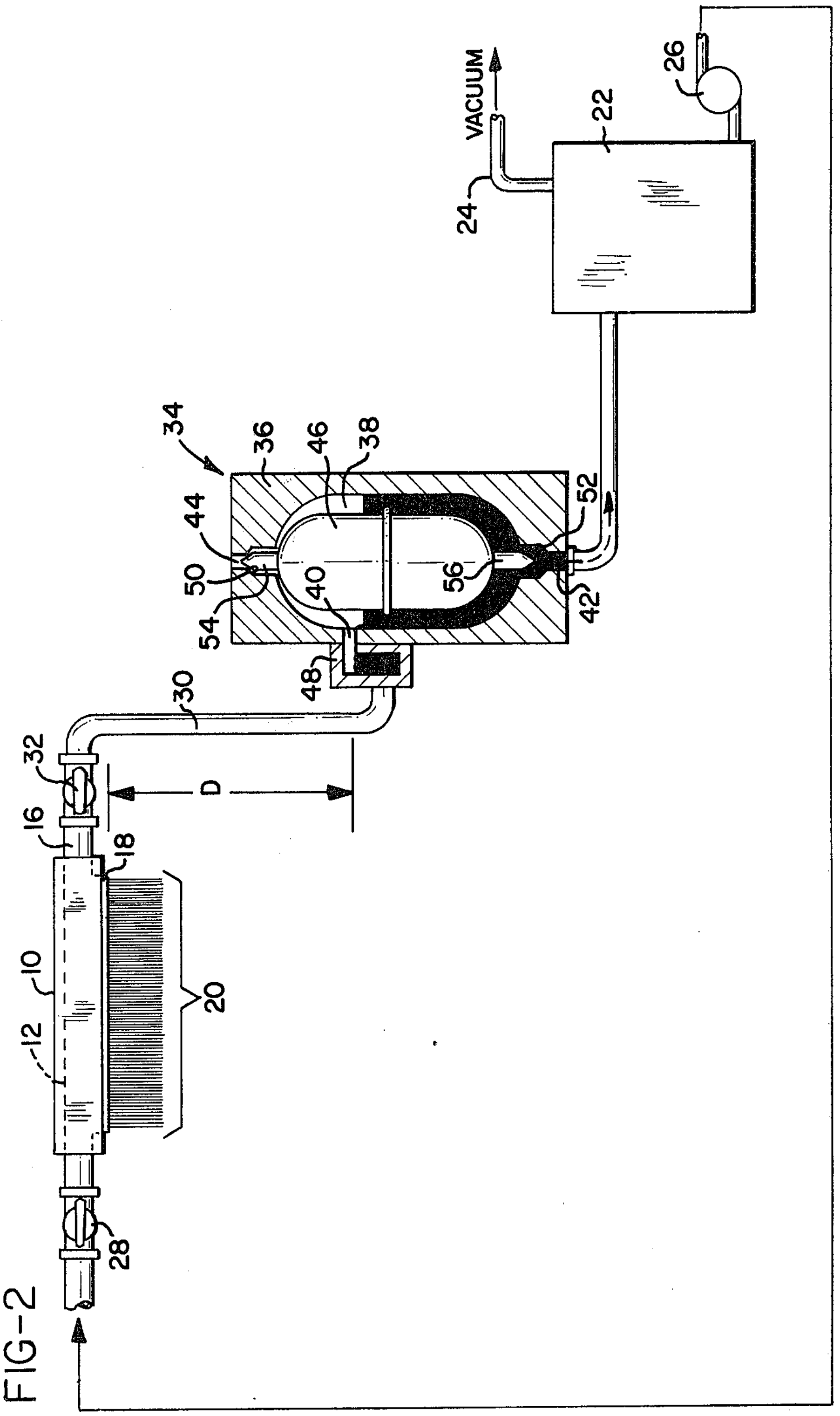
FIG. 2 is a view, similar to FIG. 1, illustrating the fluid system during cross-flushing of the print head.
Figure 3:
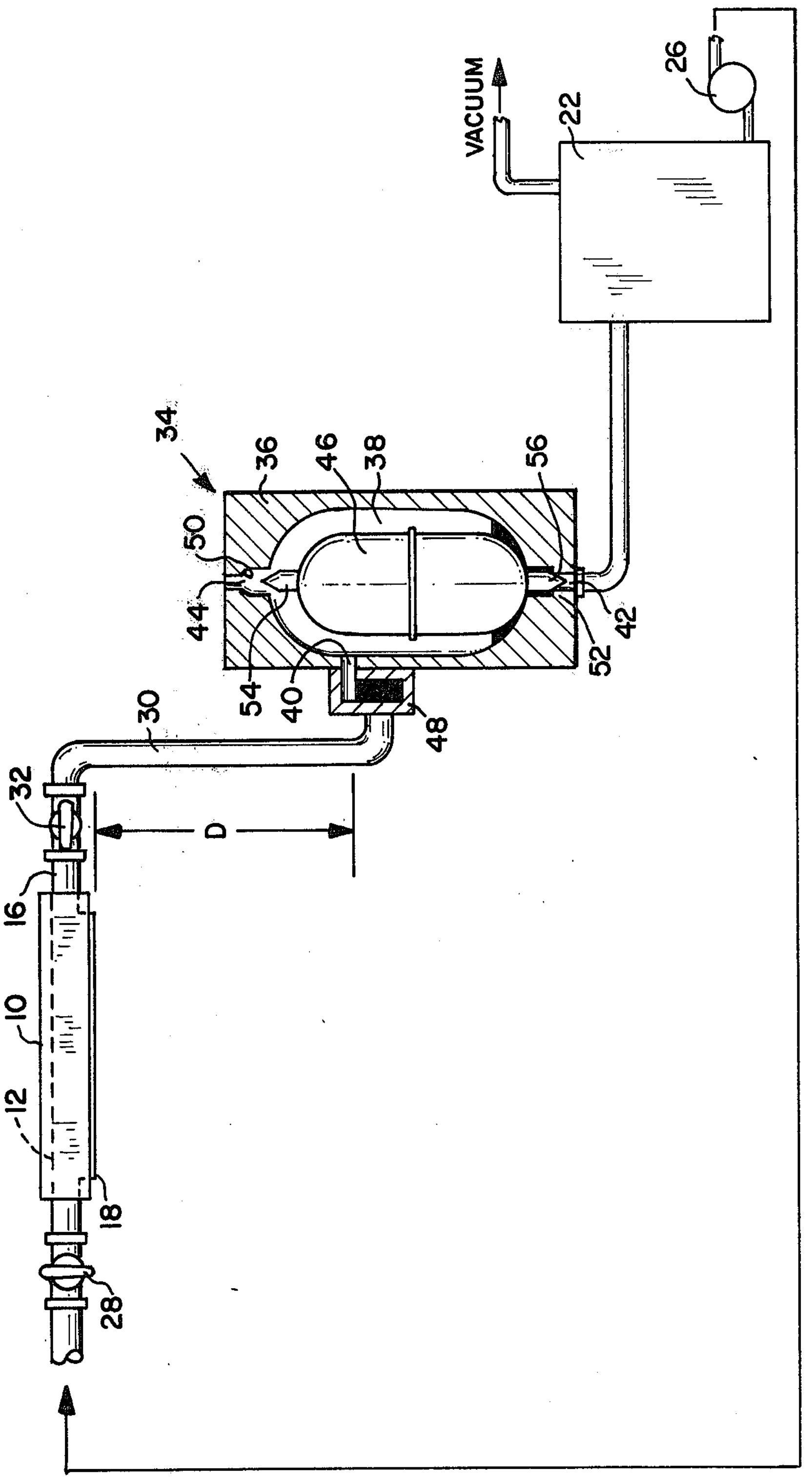
FIG. 3 is a view, similar to FIG. 1, illustrating the fluid system after shut down of the printer.

Reference is made to FIGS. 1–3 which illustrate an ink jet fluid system constructed according to the present invention. The fluid system includes a print head means 10 defining a fluid reservoir 12, and having a fluid inlet 14 and a fluid outlet 16 communicating with the reservoir 12. The print head means further includes a means, such as orifice plate 18, defining at least one orifice communicating with the reservoir 12 such that fluid supplied to the reservoir 12 under pressure flows through the orifice and emerges from the print head as a jet drop stream. In the illustrated print head, orifice plate 18 defines a plurality of orifices which produce a corresponding plurality of jet drop streams 20.

The print head means 10 is illustrated diagrammatically. It should be understood, however, that any of a number of known print head constructions may be utilized, such as those shown in the above referenced Stoneburner '121 patent, U.S. Pat. No. 4,080,607, issued Mar. 21, 1978, to Van Breemen et al., or U.S. Pat. No. 3,701,998, issued Oct. 31, 1972, to Mathis. The specific constructional and operation of such print heads are well known in the art and it is, therefore, unnecessary to describe the print head means 10 in greater detail.

A fluid supply means, including a fluid supply tank 22, is provided for supplying fluid, such as ink, to the print head means 10. The fluid supply tank 22 is connected to a vacuum source by a line 24 such that the air above the fluid in tank 22 is maintained at a pressure which is less than atmospheric pressure. Fluid is supplied by pump 26 from the tank 22 to the inlet 14 through inlet valve means 28. Valve 28 is illustrated as a manually actuated valve so that the valve can be depicted as open or closed in the drawings. It should be realized, however, that it may be desirable to provide an electrical control circuitry for automatic control of the printer and that, in such a case, solenoid actuated valves would be substituted.

A siphon line means 30 is connected to the fluid outlet 16 through outlet valve means 32. The siphon line means 30 extends downward from the outlet 16 below the orifice plate 18 by a predetermined distance D. A float valve means 34 is connected between the siphon line means 30 and the fluid supply tank 22, so as to vent the lower end of the siphon line means 30 to atmosphere thereby producing a siphon action through the siphon line means 30. The float valve means 34 further provides for fluid flow from the siphon line means 30 to the fluid supply tank, while preventing air from entering tank 22 through the float valve means.

The float valve means 34 includes a float valve casing 36 having a valve chamber 38. The valve casing defines a valve inlet 40, connected to the siphon line means 30 and communicating with the chamber 38. The float valve casing further defines a valve outlet 42, communicating with chamber 38, and a vent opening 44 which vents chamber 38 to the atmosphere.

A float 46 is provided in chamber 38 for closing the valve outlet 42 when the fluid level in the chamber is less than a minimum level, as illustrated in FIG. 1. As shown in FIG. 2, the float also closes the vent opening 44 when the fluid level in the chamber 38 exceeds a maximum level, thus preventing fluid from flowing out of the chamber 38 through the vent opening 44.

The valve inlet 40 is located on a side of the float valve casing adjacent a weir 48 connected to the lower end of the siphon line means 30. Fluid is retained within the siphon line means 30 by the weir 48. The vent opening 44 is located on the top of the casing 36 and the valve outlet 42 is located on the bottom of the casing 36. The float valve casing 36 defines a first valve seat 50 surrounding the vent opening 44 and a second valve seat 52 surrounding the valve outlet 42. The float 46 includes a first valve closure member 54 mounted on the top of the float 46 and a second valve closure member 56 mounted on the bottom of the float 46. When the first valve closure member is raised into contact with the first valve seat 50, as the fluid level in the chamber increases, the vent opening 44 is closed. Similarly, when the second valve closure member 56 is lowered into contact with the second valve seat 52, as the fluid level in the chamber 38 decreases, the valve outlet 42 is closed.

The operation of the ink jet fluid supply system of the present invention is as follows. During normal printing operations, valve 28 is open and valve 32 is closed to permit fluid from tank 22 to be supplied to the reservoir 12 under pressure by pump 26 so as to produce jet drop stream 20. A fluid column is held in the siphon line 30 by the weir 48 and valve outlet 42 is closed by the float 46, as shown in FIG. 1, such that the chamber 38 is not completely drained of fluid. Closure of the valve outlet 42 prevents air from being drawn into the tank 22 through the vent opening 44. It will be appreciated that if air were permitted to be drawn into the tank 22 through the valve outlet 42, it would not be possible to maintain the air above the fluid in tank 22 at a sub-atmospheric pressure, as is typically desired for ink supply tanks in ink jet printer fluid systems. The fluid supplied to the print head 10 via inlet 14 flows downwardly through the orifices in orifice plate 18 and produces the jet drop streams 20 in a conventional manner. The drops in the jet drop streams 20 may typically be electrically charged and deflected such that some of the drops are deposited on a fluid receiving medium while others of the drops are deflected to a drop catcher (not shown). The drops which are caught by the catcher may be returned to the fluid supply tank 22 for reapplication to the print head 10, if desired, by means of appropriate fluid lines.

When operation of the printer is to be terminated, the inlet valve 28 is closed and the outlet valve 32 is opened, as illustrated as in FIG. 3. Because the lower end of the siphon line 30 is positioned a predetermined distance D below the orifice plate 18, and, further, since the lower end of the siphon line 30 is vented to atmosphere through the vent opening 44 of the float valve 34, pressure of fluid in the reservoir 12 adjacent orifice plate 18 will be less than atmospheric pressure by an amount equal to pgD, where p is the density of the fluid. The preferred distance D depends upon the size of the orifices in plate 18 and the surface tension and density of the fluid. For example, utilizing a No. 40 ink, it has been found that the fluid pressure in the reservoir 12 should not be reduced to less than 27 inches of ink below atmospheric pressure. At a fluid pressure below this lower limit, air may be sucked into the reservoir 12 through the orifices in plate 18. If the fluid pressure in the reservoir 12 is substantially equal to atmospheric pressure, however, ink may flow through the orifices, wetting the under-side of the orifice plate and other printer elements. It has been found, therefore, that it is desirable to provide a siphon line of approximately 14 inches in length. When such a siphon line is utilized, ink does not flow through the orifices and air is not drawn into the reservoir. It will be appreciated that this arrangement for reducing fluid pressure within the reservoir 12 is advantageous in that the desired pressure is maintained even in the event of a power failure. This arrangement is simple and reliable in that no pressure regulating valves, pumps or sensors are required. Additionally, since the reservoir 12 is vented to atmosphere through the orifices in plate 18 and the lower end of the line 30 is vented to atmosphere through the float valve 34, the reduction in pressure in the reservoir 12 and the pressure differential across the orifices in plate 18 are maintained constant, regardless of fluctuations in atmospheric pressure.

It is desirable to cross flush an ink jet print head periodically. This is usually done at start up of the printer prior to initiation of printing operations. During cross flushing, ink is supplied to the print head such that it flows through the reservoir 12 and out of the outlet 16 at a relatively high flow rate. This operation tends to remove small air bubbles which may have become trapped in the reservoir 12 when the reservoir was initially filled with ink. As illustrated in FIG. 2 of the drawings, a relatively large quantity of ink may be supplied to the float valve 34 during the cross flush operation. When this occurs, the ink may enter the float valve 34 at a rate greater than the rate at which it leaves the float valve 34 through the outlet 42. In such an instance, the float 46 is raised by the increasing fluid level within the chamber 38 until the valve closure member 54 contacts the valve seat 50 to close the vent opening 44. Ink is thus prevented from escaping through the opening 44. The chamber 38 is then pressurized by the ink entering the chamber until the flow rate of the ink leaving the float valve 34 equals the flow rate of the ink entering the float valve 34. It will be appreciated that the condition depicted in FIG. 2 may also occur during shutdown of the printer, if the valve 32 is opened prior to closing valve 28.

While the method herein described, and the form of apparatus for carrying this method into effect, constitute preferred embodiments of the invention, it is to be understood that the invention is not limited to this precise method and form of apparatus, and that changes may be made in either without departing from the scope of the invention.

What is claimed is:

1. An ink jet fluid system, comprising:

print head means defining a fluid reservoir and having a fluid inlet and a fluid outlet communicating with said reservoir, said print head means further including means defining at least one orifice communicating with said reservoir such that fluid supplied to said reservoir under pressure flows through said orifice and emerges from said print head as a jet drop stream, fluid supply means, including a fluid supply tank, for supplying fluid to print head means, inlet valve means, connected between said fluid inlet and said fluid supply system, for controlling flow of fluid to said fluid reservoir of said print head from said fluid supply means, siphon line means, connected to said fluid outlet and extending downward therefrom below said orifice by a predetermined distance, and float valve means, connected between said siphon line means and said fluid supply means, for venting the lower end of said siphon line means to atmosphere to produce a siphon action therethrough, while providing for fluid flow from said siphon line means to said fluid supply means, whereby when said inlet valve means is closed at shut-down of said print head means, the fluid within said reservoir is maintained at a pressure less than atmospheric pressure by said siphon line means such that fluid is prevented from flowing through said orifice.

2. The ink jet fluid system of claim 1 in which said float valve means comprises a float valve casing defining a valve chamber, a valve inlet connected to said siphon line means and communicating with said chamber, a valve outlet connected to said fluid supply means and communicating with said chamber, a vent opening venting said chamber to the atmosphere, and a float in said chamber for closing said valve outlet when the fluid level in said chamber is less than a minimum level, whereby air is prevented from passing into said fluid supply means through said float valve means, and for closing said vent opening when the fluid level in said chamber exceeds a maximum level, whereby fluid is prevented from flowing through said vent opening.

3. The ink jet fluid system of claim 2 in which said valve inlet is located on a side of said float valve casing, and in which said float valve means includes means defining a weir at the lower end of said siphon line means, whereby fluid is maintained in said siphon line means at shut-down of said print head means so as to maintain the fluid within said print head means at a pressure less than atmospheric pressure.

4. The ink jet fluid system of claim 2 in which said vent opening is located on the top of said float valve casing and in which said valve outlet is located on the bottom of said float valve casing.

5. The ink jet fluid system of claim 4 in which said float includes a first valve closure member mounted on the top thereof and a second valve closure member mounted on the bottom thereof, and in which said float valve casing defines a first valve seat surrounding said vent opening and a second valve seat surrounding said valve outlet, whereby said first valve closure member is raised into contact with said first valve seat when the fluid level in said chamber exceeds said maximum level and said second valve closure member is lowered into contact with said second valve seat when the fluid level in said chamber is less than said minimum level.

6. In a fluid jet device for producing one or more jet drop streams of fluid drops, said device including a jet head defining a fluid receiving reservoir to which fluid is supplied under pressure from a fluid supply system and one or more orifices, communicating with said reservoir, through which fluid flows to produce said one or more jet drop streams, and in which a fluid return means is provided from said reservoir to said fluid supply system, the improvement in said fluid return means, comprising:

a downwardly extending siphon line, connected to said reservoir, for providing a reduced fluid pressure within said reservoir at shut down of said fluid jet device, thereby preventing fluid flow through said one or more orifices.

7. The fluid jet device of claim 6 in which the lower end of said siphon line is vented to atmosphere.

8. The fluid jet device of claim 7 in which said fluid return means further comprises float valve means, connected to the lower end of said siphon line, for providing return of fluid from said siphon line to said fluid supply system and for venting said siphon line to atmosphere.

9. The fluid jet device of claim 7 in which said float valve means includes a weir for retaining a fluid column within said siphon line.

10. The fluid jet device of claim 8 in which said float valve means comprises:

a float valve casing defining a valve chamber and a vent opening communicating therewith and venting said chamber to the atmosphere.

11. The fluid jet device of claim 10 in which said float valve casing further defines, a valve outlet connected to said fluid supply system, and a float in said chamber for closing said valve outlet when the fluid level in said chamber is less than a minimum level.

12. The fluid jet device of claim 11 in which said vent opening is positioned in the upper portion of said chamber above said valve outlet, whereby said float closes said vent opening when the fluid level in said valve chamber exceeds a maximum fluid level.

13. The fluid jet device of claim 12 in which said casing defines a vent seat surrounding said vent opening and a valve seat surrounding the valve outlet and in which said float carries an upper closure member for contacting said vent seat and a lower closure member for contacting said valve seat.

14. The device of claim 7 further comprising a weir connected to the lower end of said siphon line for maintaining fluid therein to the top of said weir, said top of said weir being a predetermined distance below said one or more orifices, whereby the fluid pressure in the reservoir is maintained at a level less than atmospheric pressure by a predetermined amount.

15. The device of claim 6 further comprising a weir connected to the lower end of said siphon line for maintaining a fluid column therein.

16. A method of preventing fluid flow from the fluid reservoir through the jet orifice of an ink jet print head after shut-down, said print head having a fluid inlet and a fluid outlet communicating with said fluid reservoir, and further including a fluid inlet valve controlling fluid flow through said fluid inlet, comprising the steps of:

closing the inlet valve so as to prevent fluid flow through said fluid inlet into said reservoir, and substantially simultaneously connecting said fluid outlet to the upper end of a downwardly extending siphon line and venting the lower end of said siphon line to atmosphere, whereby the fluid pressure within the fluid reservoir is less than atmospheric pressure and fluid flow through said jet orifice is prevented.

17. The method of claim 16 in which the step of connecting said fluid outlet to the upper end of a downwardly extending siphon line and venting the lower end of said siphon line to atmosphere includes the step of providing a weir at the lower end of said siphon line to maintain a fluid column therein.

18. The method of claim 17 in which the step of venting the lower end of said siphon line includes the step of maintaining the fluid level in said weir a predetermined distance below said orifice, whereby the fluid pressure in said reservoir is maintained at a level less than atmospheric pressure by a predetermined amount.

* * * * *